(12) United States Patent
Park et al.

(10) Patent No.: US 8,861,550 B2
(45) Date of Patent: Oct. 14, 2014

(54) APPARATUS AND METHOD FOR TRANSMITTING STEREOSCOPIC IMAGE DATA

(75) Inventors: Tae-Sung Park, Suwon-si (KR); Jong-Ho Kim, Suwon-si (KR); Yun-Je Oh, Suwon-si (KR); Doug-Young Suh, Seongnam-si (KR); Gwang-Hoon Park, Seongnam-si (KR); Kyu-Heon Kim, Seoul (KR); Jang-Won Lee, Chungcheongnam-do (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 838 days.

(21) Appl. No.: 12/771,368

(22) Filed: Apr. 30, 2010

(65) Prior Publication Data

US 2010/0290483 A1     Nov. 18, 2010

(30) Foreign Application Priority Data

Apr. 30, 2009   (KR) .................. 10-2009-0038233

(51) Int. Cl.
| | |
|---|---|
| H04J 3/24 | (2006.01) |
| H04N 21/235 | (2011.01) |
| H04N 21/434 | (2011.01) |
| H04N 13/00 | (2006.01) |
| H04N 21/2365 | (2011.01) |

(52) U.S. Cl.
CPC ......... *H04N 13/0066* (2013.01); *H04N 21/235* (2013.01); *H04N 21/4348* (2013.01); *H04N 21/4347* (2013.01); *H04N 13/0062* (2013.01); *H04N 21/2365* (2013.01)
USPC ........................................................ 370/472

(58) Field of Classification Search
None
See application file for complete search history.

(56) References Cited

U.S. PATENT DOCUMENTS

| | | | |
|---|---|---|---|
| 2003/0095177 A1* | 5/2003 | Yun et al. ..................... | 348/42 |
| 2005/0244050 A1* | 11/2005 | Nomura et al. ............... | 382/154 |
| 2009/0245347 A1* | 10/2009 | Lee et al. ..................... | 375/240.01 |

FOREIGN PATENT DOCUMENTS

KR        10-0716142 B1     5/2007

* cited by examiner

*Primary Examiner* — John Blanton
*Assistant Examiner* — Alan Lindenbaum
(74) *Attorney, Agent, or Firm* — Sughrue Mion, PLLC

(57) ABSTRACT

A method for transmitting stereoscopic images using a variety of transport protocols is provided. To this end, a stereoscopic image packet is defined that comprises a stereoscopic packet header and a stereoscopic video packet header. The defined stereoscopic packet header and stereoscopic video packet header are used to transmit metadata needed for transmission of stereoscopic images. By doing so, it is possible to ensure compatibility with a variety of transport protocols.

24 Claims, 9 Drawing Sheets

| expected display width (726) | expected display height (728) | expected viewing distance (730) | min of disparity (734) | max of disparity (736) |
|---|---|---|---|---|

FIG.7B

APPARATUS AND METHOD FOR TRANSMITTING STEREOSCOPIC IMAGE DATA

CROSS-REFERENCE TO RELATED APPLICATION

This application claims priority under 35 U.S.C. §119(a) from a Korean Patent Application filed in the Korean Intellectual Property Office on Apr. 30, 2009 and assigned Serial No. 10-2009-0038233, the entire disclosure of which is hereby incorporated by reference.

BACKGROUND

1. Field

Apparatuses and methods consistent with the exemplary embodiments relate to transmitting stereoscopic image data, and more particularly, to an apparatus and method for transmitting stereoscopic image data considering a variety of transport protocols.

2. Description of the Related Art

In general, a binocular stereoscopic image (hereinafter referred to as a "stereoscopic image"), as shown in FIG. 1, consists of a pair of a left image 13a and a right image 13b acquired by photographing the same subject 11 using a left camera 12a and a right camera 12b, respectively, which are spaced at a certain distance. These stereoscopic images are used to offer a three-dimensional (3D) effect on flat panel display devices.

To define a file format for displaying 3D images using the stereoscopic images, accurate information about the method of composing the images is needed. The methods of composing stereoscopic images may be divided into a method of using one Elementary Stream (ES) and a method of using two or more ESs.

Meanwhile, methods of coding the stereoscopic images may be classified according to the method of composing images. For example, in the case where one ES is used to compose stereoscopic images, the created integrated composite image is treated as one frame, enabling application of a variety of the existing video coding methods. However, in the case where two or more ESs are used to compose stereoscopic images, ESs corresponding to the left image and right image are coded independently using a variety of the existing video coding methods.

The existing video coding methods include a coding method for still images, based on Joint Photographic Experts Group (JPEG) or the like, and a coding method for videos, based on MPEG-1, MPEG-2, MPEG-4, H.264/AVC, VC-1, etc. Image data coded in the existing coding methods for still images or videos may be transmitted to display devices supporting the associated coding schemes and then played, or stored in storage media and played by the display devices at a later time.

Many methods for transmitting stereoscopic images have been proposed, and establishment of various standards is underway for efficient transmission. Accordingly, there is a need for a method of efficiently transmitting stereoscopic images considering a variety of transport protocols.

SUMMARY OF THE EXEMPLARY EMBODIMENTS

An aspect of the exemplary embodiments is to address at least the above-mentioned problems and/or disadvantages and to provide at least the advantages described below.

Accordingly, an aspect of the exemplary embodiments provides a stereoscopic image transmission apparatus and method capable of transmitting stereoscopic image packets using a variety of transport protocols.

Another aspect of the exemplary embodiments provides a stereoscopic image packet transmission apparatus and method for generating and transmitting stereoscopic image packets including a stereoscopic packet header and a stereoscopic video packet header.

Another aspect of the exemplary embodiments provides an apparatus and method for generating stereoscopic image packets so as not to be dependent on a particular transport protocol.

In accordance with one aspect of the exemplary embodiments, there is provided an apparatus for transmitting a stereoscopic image packet, including a stereoscopic packet generator for generating a stereoscopic image packet using a stereoscopic packet header, a stereoscopic video packet header, and a payload, and a transmitter for transmitting the stereoscopic image packet. The stereoscopic packet header and the stereoscopic video packet header are formed so that they are not dependent on a particular transport protocol, the stereoscopic packet header includes additional information required for playback of stereoscopic image data existing in the payload, and the stereoscopic video packet header includes attribute information of the stereoscopic image data existing in the payload.

In accordance with another aspect of the exemplary embodiments, there is provided a method for transmitting a stereoscopic image packet, including generating a stereoscopic image packet using a stereoscopic packet header, a stereoscopic video packet header, and a payload, and transmitting the stereoscopic image packet. The stereoscopic packet header and the stereoscopic video packet header are formed so that they are not dependent on a particular transport protocol, the stereoscopic packet header includes additional information required for playback of stereoscopic image data existing in the payload, and the stereoscopic video packet header includes attribute information of the stereoscopic image data existing in the payload.

BRIEF DESCRIPTION OF THE DRAWINGS

The above and other aspects of certain exemplary embodiments will be more apparent from the following description taken in conjunction with the accompanying drawings, in which:

FIGS. 7A to 7C are diagrams showing a structure of a stereoscopic packet header according to an exemplary embodiment;

DETAILED DESCRIPTION OF EXEMPLARY EMBODIMENTS

Figure 1:
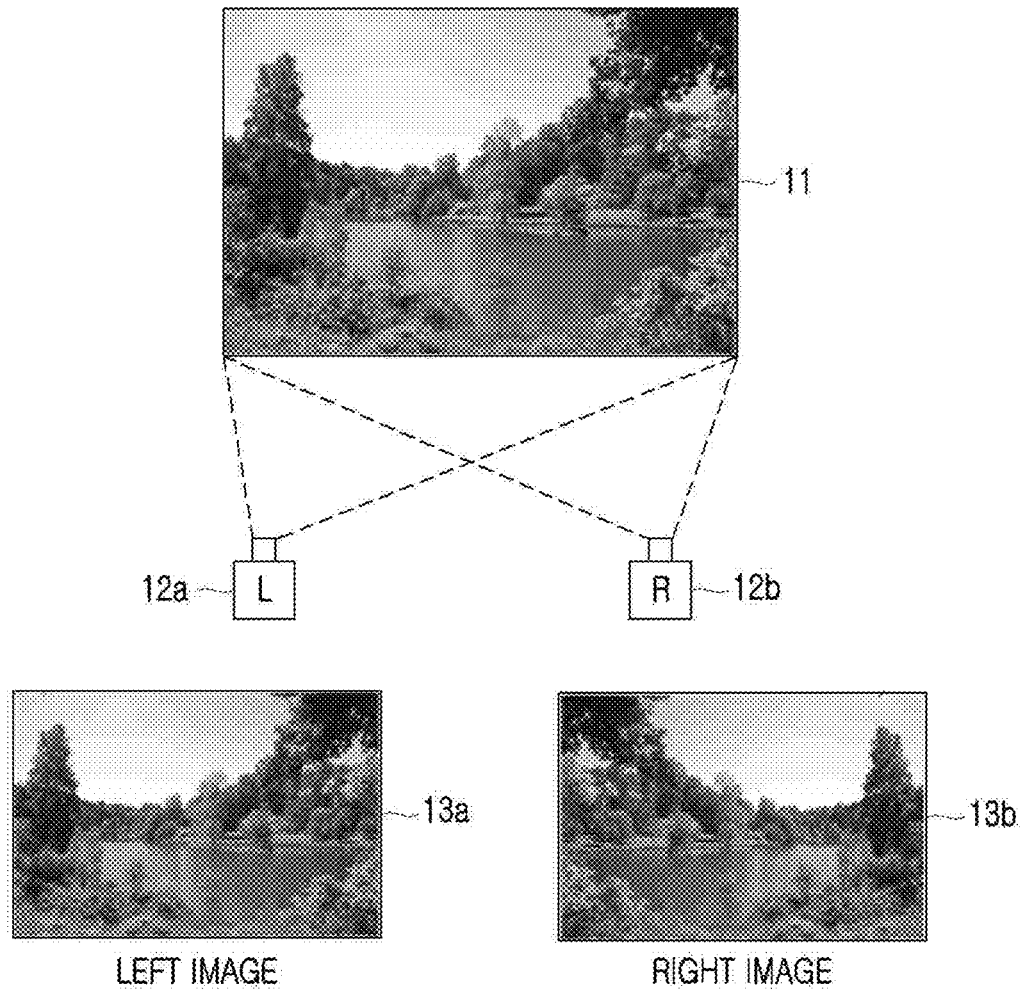
FIG. 1 is a diagram showing a binocular stereoscopic image acquired using left and right cameras.

Exemplary embodiments will now be described in detail with reference to the accompanying drawings. Throughout the drawings, the same drawing reference numerals will be understood to refer to the same elements, features and structures. In addition, descriptions of well-known functions and constructions are omitted for clarity and conciseness. Expressions such as "at least one of" modify the entire list of elements and do not modify individual elements of the list.

An exemplary embodiment provides a method capable of transmitting stereoscopic image packets using a variety of transport protocols. For this purpose, the exemplary embodiment defines a stereoscopic packet header and a stereoscopic video packet header, and also defines a stereoscopic image packet including the newly defined stereoscopic packet header and stereoscopic video packet header.

The stereoscopic packet header and stereoscopic video packet header which generate the stereoscopic image packet, are used to transmit metadata needed for transmission of stereoscopic images. Namely, the stereoscopic packet header and the stereoscopic video packet header ensure compatibility with various transport protocols.

Meanwhile, stereoscopic image packets transmitted using a transport protocol should be accurately decoded by display devices to obtain the original stereoscopic images. The stereoscopic images, unlike monoscopic images, may be composed of left/right images or reference and difference information in many different ways in display devices, to offer a 3D effect. Thus, for playback of stereoscopic images, the essential information needed for decoding should be transmitted along with image data.

Before a description of the exemplary embodiment is given, transmission packets for image data will be described below.

Generally, a transmission packet for coded image data may consist of a basic header unit and an image data unit. The basic header unit includes metadata for handling transmission, synchronization and multiplexing of the image data unit. The image data unit includes a variety of information needed for image decoding, defined in each coding standard, including texture information such as luminance and chrominance, shape information which is information about the background or objects, motion information, etc. The basic header unit including the metadata is included in a packet header of a transport protocol (e.g., Real-time Transport Protocol (RTP), Transport Stream (TS), etc.) that transmits stereoscopic image packets.

However, the above-described transmission packet, which follows the monoscopic image-based transport protocol, has limitation in delivering even the information needed to improve the 3D effect of stereoscopic images. For example, to display stereoscopic images or 3D images, accurate information about the method of composing the images is needed.

Meanwhile, methods of composing stereoscopic images are divided into a method of using integrated composite images based on one Elementary Stream (ES), and a method of using two or more ESs.

First, in the case where one ES is used, left/right images corresponding to a stereoscopic image may be formed in one ES in many different ways, as shown in FIGS. 2A to 2D.

Figure 2A:
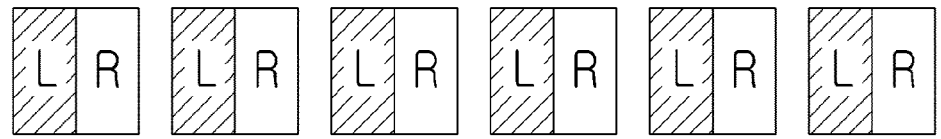
FIGS. 2A to 2D are diagrams showing different methods of composing stereoscopic images by arranging left/right images using one Elementary Stream (ES)
Figure 2B:
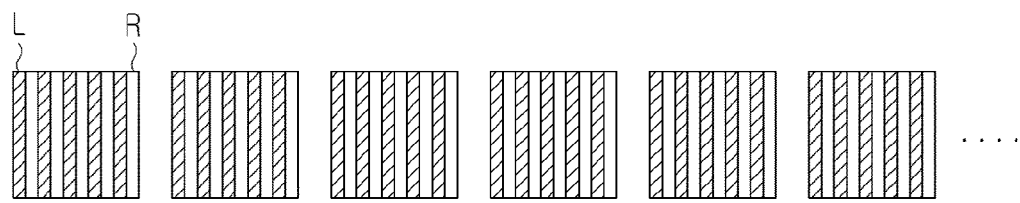
Figure 2C:
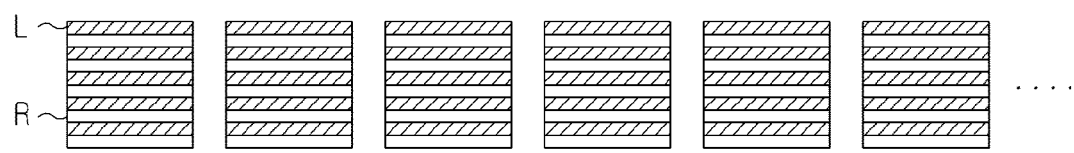
Figure 2D:

For example, the left/right images may be formed in one frame on a side-by-side basis (see FIG. 2A). The left/right images may be alternately arranged on a vertical line basis to form one frame image (see FIG. 2B). The left/right images may be alternately arranged on a horizontal line basis to form one frame image (see FIG. 2C). The left/right images may be alternately formed frame by frame (see FIG. 2D).

Figure 3:
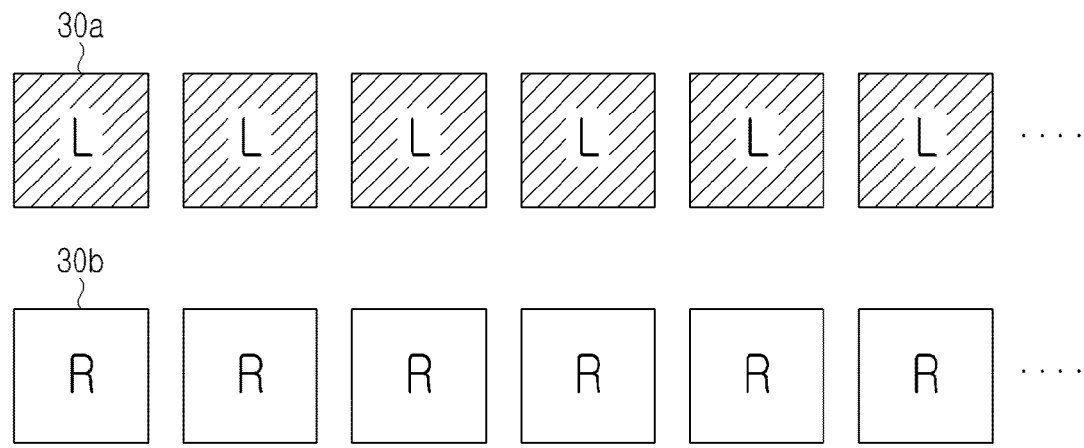
FIG. 3 is a diagram showing a method of composing a stereoscopic image using two or more ESs.

Next, in the case where two ESs are used, the ESs are comprised of consecutive left image frames 30a and right image frames 30b corresponding to a stereoscopic image, respectively, as shown in FIG. 3.

Because the ESs have various different structures as described above and thus, information about the structures is diverse, information about the stereoscopic images cannot be transmitted using the existing transmission packet.

In addition, even the information regarding stereoscopic images, provided to increase the 3D effect in a barrier-type display device, may not be transmitted through the existing transmission packet, because decoding information about monoscopic images is basically included in the transmission packet according to each coding standard. Therefore, ES's configuration information and the like required to transmit stereoscopic images may not be included either in the basic header unit or in the image data unit. That is, the current monoscopic image-based image transport protocol consisting of the basic header unit and the image data unit is not suitable to carry a variety of information provided to give the 3D effect to stereoscopic images, including an image composition method and a camera display parameter.

Accordingly, a new type of a transmission packet is needed that can carry information required for transmission of stereoscopic images regardless of the transport protocol. In addition, regarding a structure of the new transmission packet, even synchronization between left/right images of a stereoscopic image consisting of two ESs should be considered.

As described above, transmission of additional information is inevitable for transmission of stereoscopic images. However, there are various transport protocols for transmitting multimedia data, such as RTP and MPEG-2 TS, so it is difficult to directly change the transport protocols. Therefore, in proposing a structure of the new transmission packet, it is required to define a stereoscopic image packet that can carry additional information and can be effectively applied to a variety of transport protocols, and also to define a stereoscopic packet analyzer for analyzing the stereoscopic image packet.

The stereoscopic image packet may consist of either one ES or two ESs according to the composition method of left/right images, and a synchronization method between the left/right images needs to be considered in the case where the stereoscopic image packet consists of two ESs. Therefore, configuring the stereoscopic image packet according to an exemplary embodiment includes defining and identifying the stereoscopic image packet.

Figure 4:
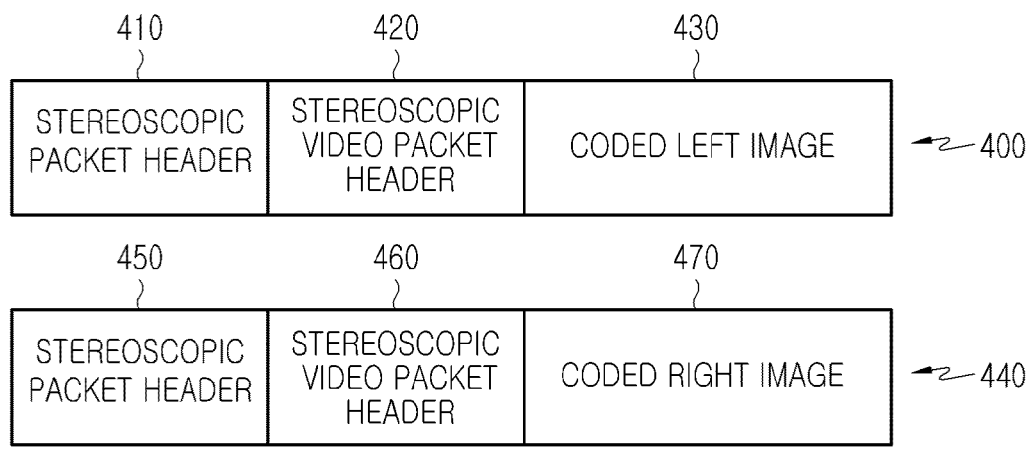
FIGS. 4 and 5 are diagrams showing structures of stereoscopic image packets according to an exemplary embodiment.
Figure 5:
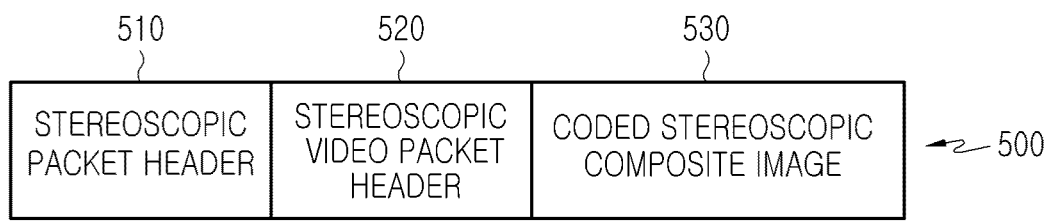

Reference will be made to FIGS. 4 and 5 to describe structures of the stereoscopic image packets defined in the exemplary embodiment.

A stereoscopic image packet proposed by the exemplary embodiment includes a stereoscopic packet header having additional information for playing the stereoscopic image, a stereoscopic video packet header having information needed to decode the stereoscopic image, and a payload carrying the image data. The image data carried on the payload is determined according to whether the stereoscopic image packet consists of one ES as shown in FIGS. 2A to 2D or two ESs, as shown in FIG. 3. The term "stereoscopic image" as used herein refers to multimedia data, and represents videos, including still images.

Specifically, the stereoscopic image consisting of two Es shown in FIG. 3 is divided into a stereoscopic image packet 400 having a left image and a stereoscopic image packet 440 having a right image as shown in FIG. 4.

The stereoscopic image packet 400 with the left image includes a stereoscopic packet header 410, a stereoscopic video packet header 420, and a payload 430 carrying a coded left image, and the stereoscopic image packet 440 with a right image also includes a stereoscopic packet header 450, a stereoscopic video packet header 460, and a payload 470 carrying a coded right image.

In contrast, in the case of stereoscopic images consisting of one ES as shown in FIGS. 2A to 2D, i.e., in the case of an integrated composite image, a stereoscopic image packet 500 includes, as shown in FIG. 5, a stereoscopic packet header 510, a stereoscopic video packet header 520, and a payload 530 carrying a coded stereoscopic composite image.

In FIGS. 4 and 5, the stereoscopic packet headers 410, 450 and 510 are described as the heads of the associated stereoscopic image packets, and serve to indicate the presence of stereoscopic images in the payloads. Each stereoscopic packet header has additional information about the entire sequence of the stereoscopic image. To be specific, it has additional information for playback of the stereoscopic image that is described on an ES basis.

For example, the additional information includes a stereoscopic image composition method, camera-related information, image size information, photography information, display information, etc. The additional information is transmitted by means of associated flags only when necessary, instead of being carried on every packet. The stereoscopic packet header is used to transmit the information applied to the entire sequence of the stereoscopic image at the needed time on a periodic basis. The 'needed time' refers to a transmission time of randomly accessible packets such as Instantaneous Decoding Refresh (IDR) pictures.

The stereoscopic video packet headers 420, 460 and 520 have attribute information about their individual stereoscopic image packets. To be specific, they serve to carry analysis information about the stereoscopic images, including decoding-related information and playback information of stereoscopic images in the individual packets.

For example, the stereoscopic video packet headers include mixed images having stereoscopic images and monoscopic images, or include information indicating the stereo/mono characteristic of individual packets, a time stamp needed for a decoding operation, inclusion/non-inclusion of start/end of an access unit, and stuffing byte information, in a single stereoscopic image. The stereoscopic video packet headers are used to transmit information applied to individual frames or individual packets of stereoscopic images, in every packet.

The payloads 430, 470 and 530 serve to carry all or some of the access unit of decoded data of the stereoscopic images.

If the left image and right image are transmitted by different stereoscopic image packets as shown in FIG. 4, a display device or a receiver needs to know information for synchronization between the left image and right image of the stereoscopic image. Such pairing information between the left image and right image is inserted into the stereoscopic video packet headers. Structures of the stereoscopic packet headers and stereoscopic video packet headers will be described in detail later.

Figure 6:
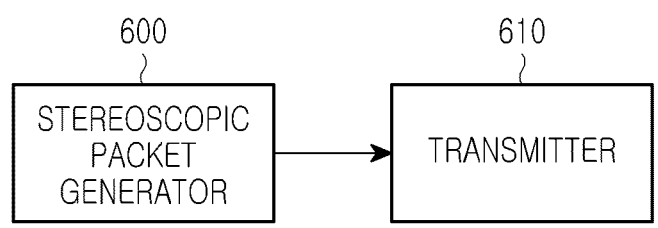
FIG. 6 is an internal block diagram of a stereoscopic image packet transmission apparatus according to an exemplary embodiment.

Reference will now be made to FIG. 6 to describe a process of generating stereoscopic image packets with the structure of FIG. 4 or 5. FIG. 6 shows a structure of a stereoscopic image packet transmission apparatus according to an exemplary embodiment.

Referring to FIG. 6, a stereoscopic packet generator 600 generates stereoscopic image packets with the structure of FIG. 4 or 5, and a transmitter 610 transmits the generated stereoscopic image packets.

To be specific, the stereoscopic packet generator 600 includes the information needed to transmit stereoscopic images regardless of various transport protocols, in the stereoscopic packet headers and the stereoscopic video packet headers.

Figure 7A:
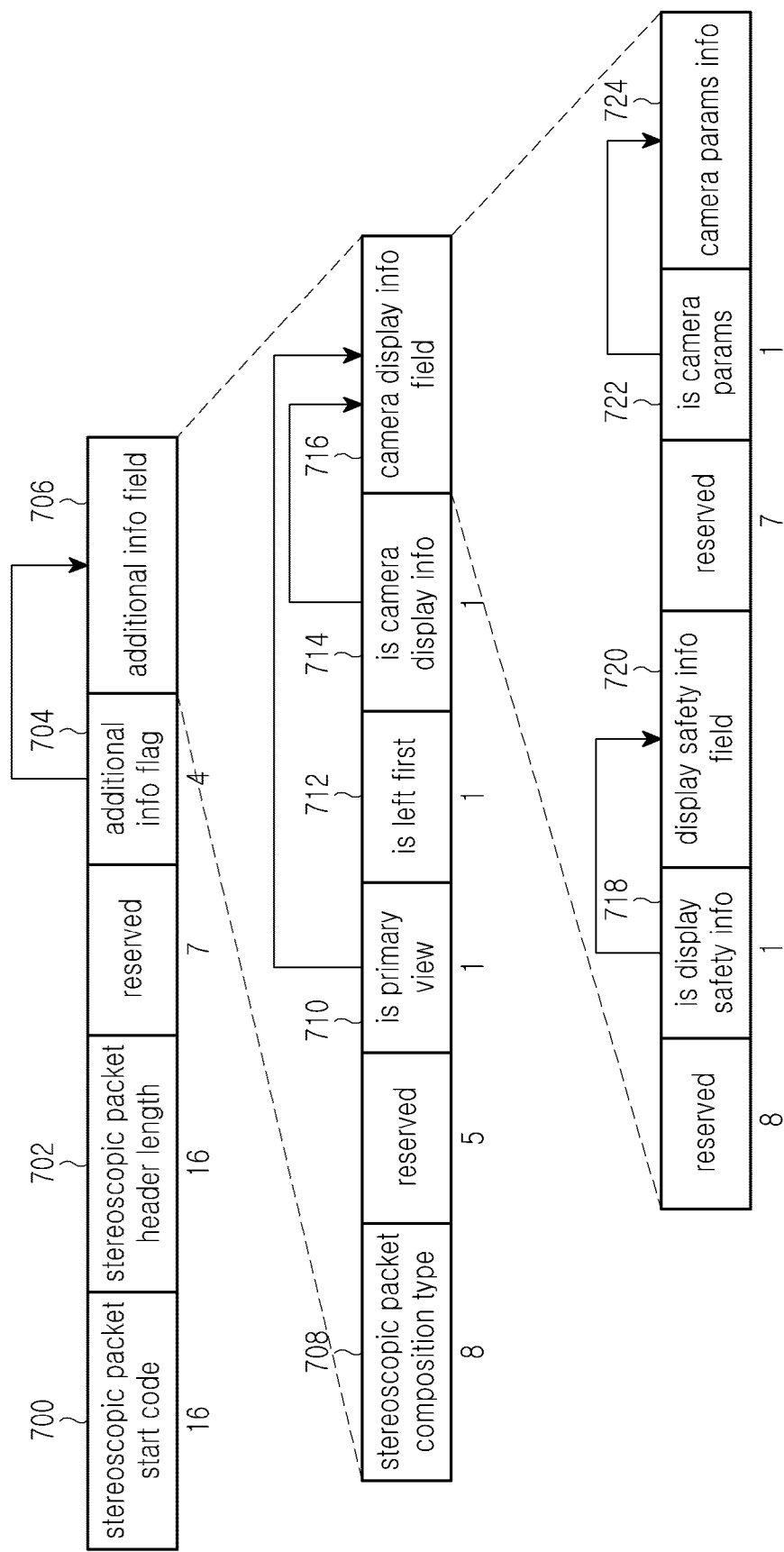
Figure 7C:
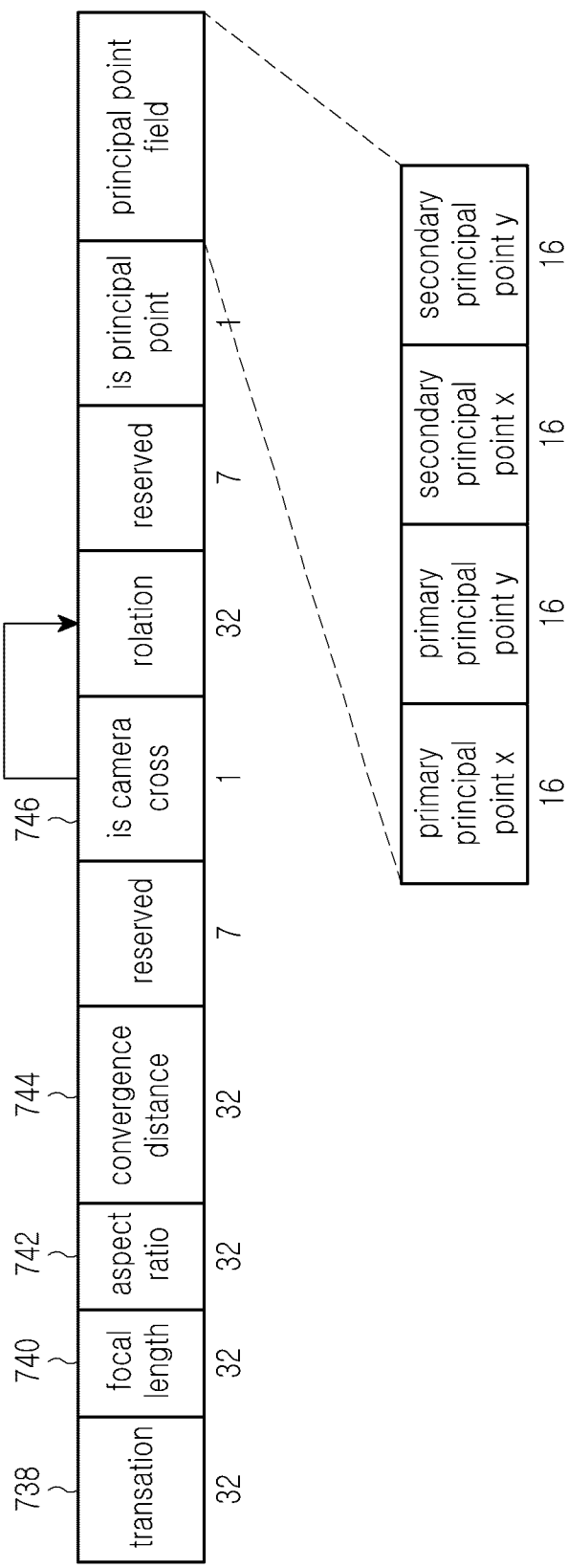

The stereoscopic packet header may be formed as shown in FIGS. 7A to 7C, with a descriptor formed therein according to an exemplary embodiment.

Referring to FIG. 7A, a stereoscopic packet header includes a stereoscopic packet start code (stereoscopic_packet_start_code) 700 indicating a start of the stereoscopic packet header, a stereoscopic packet header length (stereoscopic_packet_header_length) 702 representing a length of the stereoscopic packet header, and a stereoscopic additional information flag (stereoscopic_additional_info_flag) 704 indicating the presence of an additional information field (additional_info_field) 706 for playback of the stereoscopic image.

Needed information is inserted into the additional information field (additional_info_field) 706 on an ES basis. Thus, a value of the additional information flag (stereoscopic_additional_info_flag) 704 may be set to 1 during transmission, only in the randomly accessible packet like the packet including IDR pictures of video data. The additional information field 706 is included in the stereoscopic packet header using a flag only when necessary, because not every stereoscopic image packet carries all information.

A stereoscopic composition type (stereoscopic_packet_composition_type) 708 represents the stereoscopic image composition methods shown in FIGS. 2A to 2D and FIG. 3. The stereoscopic composition type (stereoscopic_packet_composition_type) 708 includes a side-by-side method, a vertical line interleaved method, a frame sequential method, a left/right view sequence method, and a horizontal line method. The composition methods may be identified by different values.

For example, a value for identifying the stereoscopic composition type (stereoscopic_packet_composition_type) 708 may be set to 0 for the side-by-side method, 1 for the vertical line interleaved method, 2 for the frame sequential method, 3 for the left/right view sequence method, and 4 for the horizontal line method.

A primary view (is_primary_view) 710 represents identification information for left/right images, and is set to 1 for the packet containing a reference image in the case of the stereoscopic image consisting of two ESs, shown in FIG. 3. This serves to indicate that the current image is a reference image, in the case where a value of the stereoscopic composition type (stereoscopic_packet_composition_type) 708 is set to 3. That is, the primary view (is_primary_view) 710 serves to indicate that one of the two stereoscopic image packets that have a left image and a right image, respectively, as shown in FIG. 4, is a reference image. The primary view (is_primary_view) 710 is set to 0, if the stereoscopic composition type (stereoscopic_packet_composition_type) 708 is set to one of 0~2 and 4.

A left first (is_left_first) 712 serves to indicate a composition method for left/right images. If 1 is set in the left first (is_left_first) 712, it indicates that the left is a left image in the side-by-side method, the left is an odd-numbered line in the vertical line interleaved method, the left is an odd-numbered frame in the frame sequential method, the left exists as a primary view in the left/right view sequence method, and the left image exists in an odd-numbered line in the horizontal line method. However, if 0 is set in the left first (is_left_first) 712, the above are reversed.

Camera display information (is_camera_display_information) 714 serves to indicate the present/absence of a camera and display field (camera_display_info_field) 716. The camera and display field (camera_display_info_field) 716 includes display safety information (is_display_safety_info) 718 indicating the presence of a display safety information field (display_safety_info_field) 720, and a camera parameter (is_camera_params) 722 indicating the presence of a camera parameter field (camera_params_field) 724.

A structure of the display safety information field (display_safety_info_field) 720 is shown in FIG. 7B.

Referring to FIG. 7B, the display safety information field (display_safety_info_field) 720 includes a display width (expected_display_width) 726 indicating an image width appropriate for the display, a display height (expected_display_height) 728 indicating an image height appropriate for the display, a viewing distance (expected_viewing_distance) 730 indicating a viewing distance appropriate for the display, a minimum disparity (min_of_disparity) 734 indicating the minimum spacing, and a maximum disparity (max_of_disparity) 736 indicating the maximum spacing.

A structure of the camera parameter field (camera_params_field) 724 is shown in FIG. 7C.

Referring to FIG. 7C, the camera parameter field (camera_params_field) 724 includes a transaction 738 indicating information obtained by representing locations of two cameras in vector, a focal length (focal_length) 740 indicating a distance between an image plane and a view point, an aspect ratio (aspect_ratio) 742 indicating a ratio of a vertical focal length to a horizontal focal length, a convergence distance (convergence_distance) 744 indicating a distance from the center of the two cameras to a convergence point of the two cameras' view points, and a camera cross (is_camera_cross) 746 indicating parallel/cross placement of the two cameras. For example, a value set in the camera cross (is_camera_cross) 746 is 0 for the parallel placement, and 1 for cross placement.

The stereoscopic packet header in FIGS. 7A to 7C may be expressed in syntax as shown in Table 1 below.

TABLE 1

```
StereoscopicPacketHeader( ){
    uint(16)    stereoscopic packet start code;
    uint(16)    stereoscopic packet header length;
    uint(7)     reserved = 0;
    uint(1)     stereoscopic_additional info flag;
    if(stereoscopic additional info flag){
        uint(8)     stereoscopic composition type;
        bit(5)      reserved = 0;
        bit(1)      is primary view;
        bit(1)      is left first;
        bit(1)      is camera display information;
        if(is primary view == 0 && is carmera display information){
            // stereoscopic display information
            unsigned int(7)     reserved = 0;
            unsigned int(1)     is display safety info;
            if(is display safety info) {
                unsigend int(16)    expected display width;
                unsigend int(16)    expected display height;
                unsigend int(16)    expected viewing distance;
                int(16)             min of disparity;
                int(16)             max of disparity;
            }
            // stereoscopic camera information
            unsigned int(7)     reserved = 0;
            unsigned int(1)     is cam params;
            if(is cam params){
```

TABLE 1-continued

```
                unsigned int(32)    translation[3];
                unsigned int(32)    focal length;
                unsigned int(32)    aspect ratio;
                unsigned int(32)    convergence distance;
                unsigned int(3)     reserved = 0;
                unsigned int(1)     is camera cross;
                unsigned int(3)     reserved = 0;
                unsigned int(1)     is principal point;
                if (is camera cross){
                    unsigned int(32)    rotation[3];
                }
                if (is principal point){
                    unsigned int(16)    primary principal point x;
                    unsigned int(16)    primary principal point y;
                    unsigned int(16)    secondary principal point x;
                    unsigned int(16)    secondary principal point y;
                }
            }
        }
    }
}
```

Figure 8:
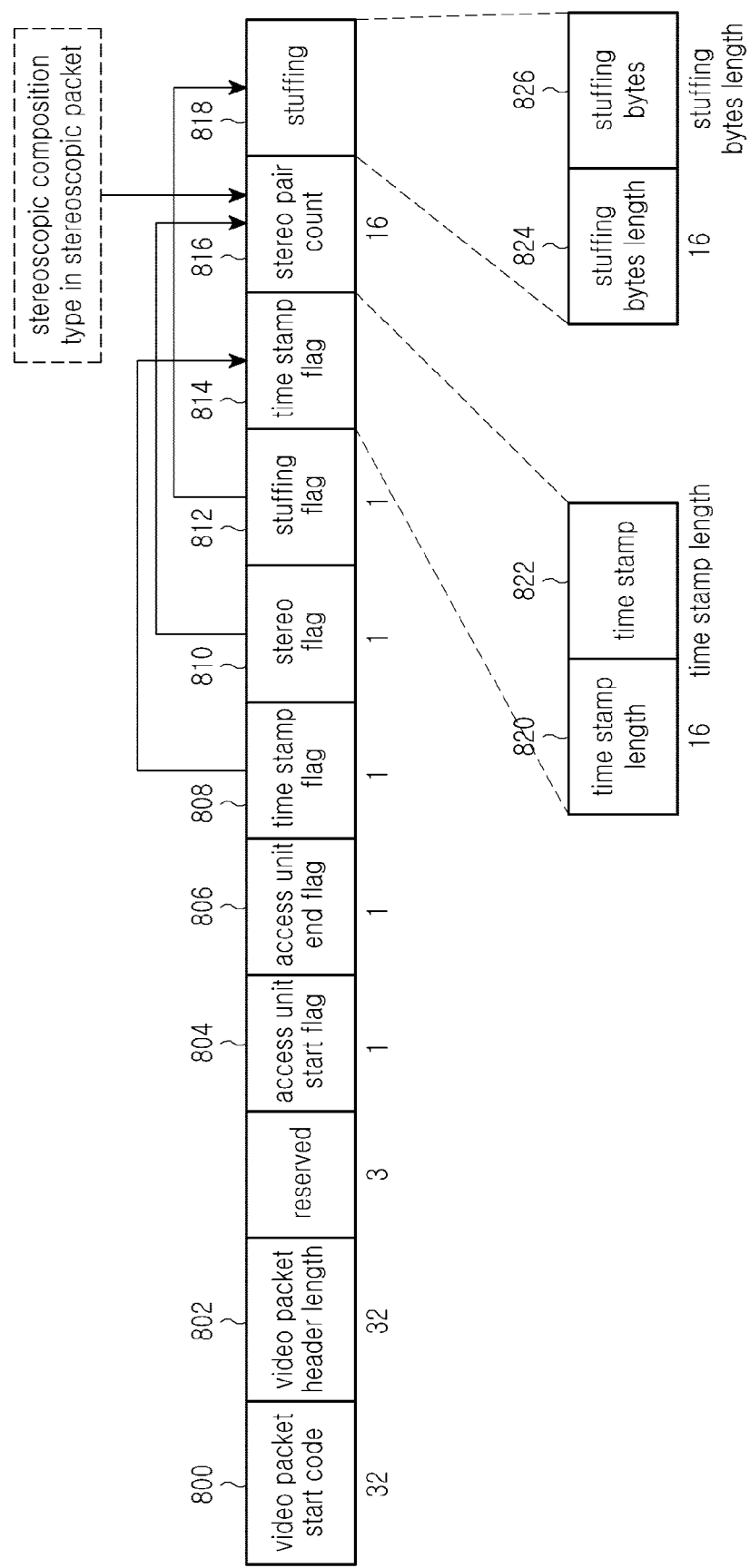
FIG. 8 is a diagram showing a structure of a stereoscopic video packet header according to an exemplary embodiment.

Reference will now be made to FIG. 8 to describe a structure of the stereoscopic video packet header. FIG. 8 shows a structure of a stereoscopic video packet header according to an exemplary embodiment.

Referring to FIG. 8, the stereoscopic video packet header may include a flag indicating whether the current packet is a stereoscopic packet or a monoscopic packet, and information for synchronization of two image frames in the case of a packet consisting of two ESs.

This stereoscopic video packet header includes a video packet start code (video_packet_start_code) 800 that is a unique start code defined in a stereoscopic packet descriptor and indicates a start of the stereoscopic video packet header, a stereo flag (stereo_flag) 810 serves to indicate whether the current packet is a stereoscopic packet or a monoscopic packet in the case of a stereo-mono mixed image, and a pair count (stereoscopic_pair_count) 816 indicating information needed for synchronization between frames in pairs in the case where a left image and a right image are formed in two packets.

Regarding the pair count (stereoscopic_pair_count) 816, in the case of 2-stream stereoscopic data in which every packet has one frame, frames making a pair have the same value, and the pair count (stereoscopic_pair_count) 816 increases sequentially from 0 to 65535 on a repeated basis.

In addition, a video packet header length (video_packet_header_length) 802 indicates a length of the stereoscopic video packet header, a start flag (access_unit_start_flag) 804 indicates inclusion of a start part of a video Access Unit (AU), and an end flag (access_unit_end_flag) 806 serves to indicate inclusion of an end of the video AU. A time stamp flag (time_stamp_flag) 808 indicates the presence of a time stamp in a video packet, and a stuffing flag (stuffing_flag) 812 serves to indicate the presence of stuffing bytes.

A time stamp field (time_stamp_flag) 814 consists of a time stamp length (time_stamp_length) 820 a length of a time stamp (time_stamp) 822, and the time stamp (time_stamp) 822 indicating an operation time in a processing device, such as a decoding time.

A stuffing 818 consists of a stuffing byte length (stuffing_bytes_length) 824 indicating a length of stuffing bytes, and a stuffing bytes (stuffing_bytes) 826, in which empty parts are filled with 1 to adjust a length of the stereoscopic image packet. The stuffing bytes are unused during decoding.

The stereoscopic video packet header in FIG. 8 may be expressed in syntax as shown in Table 2 below.

TABLE 2

```
StereoscopicVideoPacketHeader(stereoscopic composition type){
    uint(16) video packet start code;
    uint(16) video packet header length code;
    bit(3)   reserved = 0;
    bit(1)   access unit start flag;
    bit(1)   access unit end flag;
    bit(1)   time stamp flag;
    bit(1)   stereo flag;
    bit(1)   stuffing flag;
    if(time stamp flag){
        uint(8) time stamp length;
        uint(time stamp length) time stamp;
    }
    if(stereo flag && stereoscopic composition type == 3){
        uint(16) stereoscopic pair count;
    }
    if(stuffing flag){
        uint(16) stuffing bytes length;
        for(i=0; i<stuffing bytes length; i++)
            uint(8) stuffing bytes = 0xFF;
    }
}
```

The syntax of the stereoscopic video packet header is created as in Table 2 to carry a left image and a right image on a payload according to the composition type interpreted in the stereoscopic packet header.

As described above, the exemplary embodiment generates a separate packet using a stereoscopic image and additional information about the image, and transmits the generated packet, thus overcoming the limitation in carrying the additional information on the existing TS. In addition, the exemplary embodiment may be applied to a variety of transport protocols regardless of the type of the transport protocols. For example, it is possible to ensure compatibility with image transport protocols for transmitting multimedia data, such as RTP and MPEG-2 TS. Besides, the exemplary embodiment can be used in broadcast and multimedia services based on stereoscopic images.

Figure 9:
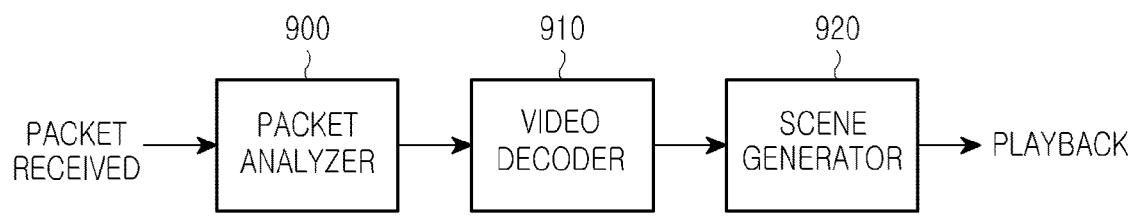
FIG. 9 is an internal block diagram of an apparatus for processing stereoscopic image packets according to an exemplary embodiment.

FIG. 9 shows an internal block diagram of an apparatus for processing stereoscopic image packets according to an exemplary embodiment. The processing apparatus may be a terminal or a display device.

The processing apparatus includes a packet analyzer 900, a video decoder 910, and a scene generator 920.

Upon receiving a stereoscopic image packet, the packet analyzer 900 analyzes a stereoscopic packet header of the received packet. Through the analysis, the packet analyzer 900 acquires information such as a stereoscopic image composition method and a camera display parameter. The acquired information is delivered to the scene generator 920 and used for scene generation.

The packet analyzer 900 analyzes even a stereoscopic video packet header. For example, the packet analyzer 900 analyzes playback information for stereoscopic images of individual packets, such as determining whether the current packet is a stereoscopic packet or a monoscopic image by analyzing the stereo flag 810. The analyzed playback information is also provided to the scene generator 920.

The video decoder 910 decodes coded image data contained in the payload. To be specific, depending on the stereoscopic image composition method in which a stereoscopic image consists of one ES, all or some of coded information of one frame may be contained in the stereoscopic composite image. Also, an image data unit may be constructed in one packet with two frames of a left image and a right image. In this case, the coded stereoscopic images are decoded in the same method as the general image.

In the case of a stereoscopic image consisting of two ESs, a left image and a right image are simultaneously decoded in two decoding units in the video decoder 910. Particularly, in an exemplary embodiment, if a left image and a right image are formed in their associated packets as shown in FIG. 4, the packet analyzer 900 should analyze left/right image pairing information described in the stereoscopic video packet headers of the relevant packets and deliver the analyzed pairing information to the scene generator 920.

Then the scene generator 920 generates a scene according to the characteristics of a display device using the stereoscopic image decoded based on the stereoscopic image composition method and the camera display parameter.

Meanwhile, in the case of a stereoscopic image consisting of two packets of a left image and a right image, the scene is generated by finding a pair of images based on the left/right image pairing information in the stereoscopic video packet headers. By doing so, synchronization is possible between the left image and right image of the stereoscopic image consisting of two ESs, making it possible to play stereoscopic images offering the 3D effect.

While the exemplary embodiments have been shown and described with reference to certain exemplary embodiments thereof, it will be understood by those skilled in the art that various changes in form and details may be made therein without departing from the spirit and scope of the exemplary embodiments as defined by the appended claims and their equivalents.

What is claimed is:

1. An apparatus for transmitting a stereoscopic image packet, the apparatus comprising;
   a stereoscopic packet generator which generates a stereoscopic image packet using a stereoscopic packet header, a stereoscopic video packet header, and a payload; and
   a transmitter which transmits the stereoscopic image packet;
   wherein the stereoscopic packet header and the stereoscopic video packet header are formed so that the stereoscopic packet header and the stereoscopic video packet header are not dependent on a particular transport protocol, the stereoscopic packet header comprises additional information required for playback of stereoscopic image data existing in the payload, and the stereoscopic video packet header comprises attribute information of the stereoscopic image data in the payload,
   wherein the attribute information comprises decoding information and a time-stamp needed for a decoding operation, and
   wherein the additional information is transmitted based on associated flags only in packets including Instantaneous Decoding Refresh (IDR) pictures of video data to process stereoscopic image data related to the additional information, and the stereoscopic packet header periodically transmits information applied to an entire sequence of the stereoscopic image data.

2. The apparatus of claim 1, wherein the stereoscopic image data in the payload is at least one of integrated composite image data of mixed left image data and right image data, left image data of the stereoscopic image data, and right image data of the stereoscopic image data.

3. The apparatus of claim 2, wherein the additional information is information applied to an entire sequence of the stereoscopic image data and transmission of the entire sequence of the stereoscopic image is determined by an additional information flag, and the additional information comprises at least one of stereoscopic image composition information, reference image identification information, a stereoscopic image composition method, and camera and display information added by camera display information.

4. The apparatus of claim 3, wherein the stereoscopic packet header further comprises start point information of the stereoscopic packet header, and length information of the stereoscopic packet header.

5. The apparatus of claim 4, wherein the camera and display information comprises display safety information comprising information about a display width, a display height, a viewing distance, and minimum spacing and maximum spacing disparities, and camera parameter information including information about a camera position vector, a focal length, a vertical-to-horizontal focal length ratio, a convergence distance, and parallel or cross placement of two cameras.

6. The apparatus of claim 5, wherein the stereoscopic image composition information is information which designates one of a side-by-side method, a vertical line interleaved method, a frame sequential method, a left/right view sequence method, and a horizontal line method.

7. The apparatus of claim 2, wherein the stereoscopic video packet header further comprises an image packet identification flag which determines whether an image packet to be transmitted is a stereoscopic packet or a monoscopic packet, and information for synchronization between a left image frame and a right image frame.

8. The apparatus of claim 7, wherein the stereoscopic video packet header further comprises a video packet start code, a length of the stereoscopic video packet header, information about a start and an end of an access unit, time stamp information, and stuffing byte information.

9. The apparatus of claim 8, wherein the time stamp information comprises a length of a time stamp, and an operating time for which a processing apparatus processes a received stereoscopic image packet.

10. The apparatus of claim 8, wherein the stuffing byte information comprises a length of stuffing bytes, and bytes added to adjust a length of the stereoscopic image packet.

11. A method for transmitting a stereoscopic image packet, comprising;
generating a stereoscopic image packet using a stereoscopic packet header, a stereoscopic video packet header, and a payload; and
transmitting the stereoscopic image packet;
wherein the stereoscopic packet header and the stereoscopic video packet header are formed so that the stereoscopic packet header and the stereoscopic video packet header are not dependent on a particular transport protocol, the stereoscopic packet header comprises additional information required for playback of stereoscopic image data existing in the payload, and the stereoscopic video packet header comprises attribute information of the stereoscopic image data in the payload,
wherein the attribute information comprises decoding information and a time-stamp needed for a decoding operation, and
wherein the additional information is transmitted based on associated flags only in packets including Instantaneous Decoding Refresh (IDR) pictures of video data to process stereoscopic image data related to the additional information, and the stereoscopic packet header periodically transmits information applied to an entire sequence of the stereoscopic image data.

12. The method of claim 11, wherein the stereoscopic image data in the payload is at least one of integrated composite image data of mixed left image data and right image data, left image data of the stereoscopic image data, and right image data of the stereoscopic image data.

13. The method of claim 12, wherein the additional information is information applied to an entire sequence of the stereoscopic image data and transmission of the entire sequence of the stereoscopic image is determined by an additional information flag, and comprises at least one of stereoscopic image composition information, reference image identification information, a stereoscopic image composition method, and camera and display information added by camera display information.

14. The method of claim 13, wherein the stereoscopic packet header further comprises start point information of the stereoscopic packet header, and length information of the stereoscopic packet header.

15. The method of claim 14, wherein the camera and display information comprises display safety information comprises information about a display width, a display height, a viewing distance, and minimum spacing and maximum spacing disparities, and camera parameter information including information about a camera position vector, a focal length, a vertical-to-horizontal focal length ratio, a convergence distance, and parallel or cross placement of two cameras.

16. The method of claim 15, wherein the stereoscopic image composition information is information designating one of a side-by-side method, a vertical line interleaved method, a frame sequential method, a left/right view sequence method, and a horizontal line method.

17. The method of claim 12, wherein the stereoscopic video packet header further comprises an image packet identification flag for determining whether an image packet to be transmitted is a stereoscopic packet or a monoscopic packet, and information for synchronization between a left image frame and a right image frame.

18. The method of claim 17, wherein the stereoscopic video packet header further comprises a video packet start code, a length of the stereoscopic video packet header, information about a start and an end of an access unit, time stamp information, and stuffing byte information.

19. The method of claim 18, wherein the time stamp information comprises a length of a time stamp, and an operating time for which a processing apparatus processes a received stereoscopic image packet.

20. The method of claim 18, wherein the stuffing byte information comprises a length of stuffing bytes, and bytes added to adjust a length of the stereoscopic image packet.

21. An apparatus for transmitting a stereoscopic image packet, the apparatus comprising;
a stereoscopic packet generator which generates a stereoscopic image packet using a stereoscopic packet header, a stereoscopic video packet header, and a payload; and
a transmitter which transmits the stereoscopic image packet,
wherein the stereoscopic video packet header comprises decoding information and a time-stamp needed for a decoding operation, and
wherein the additional information is transmitted based on associated flags only in packets including Instantaneous Decoding Refresh (IDR) pictures of video data to process stereoscopic image data related to the additional information, and the stereoscopic packet header periodically transmits information applied to an entire sequence of the stereoscopic image data.

22. The apparatus of claim 21, wherein the stereoscopic packet header and the stereoscopic video packet header are not dependent on a specific transport protocol.

23. The apparatus of claim 21, wherein the stereoscopic packet header comprises additional information required for playback of the stereoscopic image data in the payload.

24. The apparatus of claim 21, wherein the stereoscopic video packet header comprises attribute information of stereoscopic image data in the payload.

* * * * *